(12) United States Patent
Miyaji et al.

(10) Patent No.: US 10,792,707 B2
(45) Date of Patent: Oct. 6, 2020

(54) SORTING DEVICE

(71) Applicant: Panasonic Intellectual Property Management Co., Ltd., Osaka (JP)

(72) Inventors: Naoya Miyaji, Osaka (JP); Shingo Hamada, Osaka (JP); Hiroshi Nagayasu, Fukuoka (JP); Hiroshi Kusumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 100 days.

(21) Appl. No.: 16/168,676

(22) Filed: Oct. 23, 2018

(65) Prior Publication Data
US 2019/0143376 A1    May 16, 2019

(30) Foreign Application Priority Data
Nov. 15, 2017   (JP) .................................. 2017-219870

(51) Int. Cl.
*B07C 5/02* (2006.01)
*B07C 5/36* (2006.01)
*B07C 5/34* (2006.01)
*B29B 17/02* (2006.01)

(52) U.S. Cl.
CPC ............... *B07C 5/368* (2013.01); *B07C 5/02* (2013.01); *B07C 5/34* (2013.01); *B07C 5/362* (2013.01); *B29B 17/02* (2013.01); *B07C 2501/0018* (2013.01); *B07C 2501/0054* (2013.01);
(Continued)

(58) Field of Classification Search
CPC .. B07C 5/368; B07C 5/02; B07C 5/34; B07C 5/362; B29B 17/02
See application file for complete search history.

(56) References Cited

U.S. PATENT DOCUMENTS

| | | | | |
|---|---|---|---|---|
| 2,481,961 A | * | 9/1949 | Ward, Jr. ............... | F23D 14/38 239/132.3 |
| 3,489,277 A | * | 1/1970 | Silverman .............. | B07C 5/366 209/587 |

(Continued)

FOREIGN PATENT DOCUMENTS

| FR | 3066415 A1 * 11/2018 | ............. B07C 5/368 |
|---|---|---|
| JP | 2016-117038    6/2016 | |

(Continued)

OTHER PUBLICATIONS

Extended European Search Report dated Mar. 21, 2019 in corresponding European Patent Application No. 18199288.4.

*Primary Examiner* — Patrick H Mackey
(74) *Attorney, Agent, or Firm* — Wenderoth, Lind & Ponack, L.L.P.

(57) ABSTRACT

A sorting device includes a transport unit, an identification unit, and a plurality of nozzles. Each of the plurality of nozzles has a valve that adjusts a flow amount of pulse air, a pulse air flow path that is connected to the valve, and a pulse air blowing port that is arranged at a tip end of the pulse air flow path. The pulse air flow path has at least one bent portion. An adjustment flow path is connected to the bent portion of the pulse air flow path. An adjustment member capable of increasing and decreasing a volume of the adjustment flow path is provided in the adjustment flow path.

9 Claims, 9 Drawing Sheets

(52) U.S. Cl.
CPC ............... *B29B 2017/0203* (2013.01); *B29B 2017/0234* (2013.01)

(56) References Cited

U.S. PATENT DOCUMENTS

| | | | |
|---|---|---|---|
| 5,350,118 A * | 9/1994 | Mitchell | B07C 5/3422 209/577 |
| 7,997,413 B2 * | 8/2011 | Schmitz | D01G 31/003 209/44.2 |
| 8,919,565 B2 * | 12/2014 | Yamaguchi | B07C 5/3427 209/44.2 |
| 9,199,283 B2 | 12/2015 | Kojima et al. | |
| 9,381,546 B2 | 7/2016 | Miyasaka et al. | |
| 9,808,835 B2 | 11/2017 | Yamaguchi et al. | |
| 10,052,663 B2 * | 8/2018 | Klein | F15B 13/0878 |
| 10,092,931 B2 * | 10/2018 | Klein | F15B 13/0871 |
| 2014/0197078 A1 | 7/2014 | Kojima et al. | |
| 2015/0231671 A1 | 8/2015 | Miyasaka et al. | |
| 2016/0175889 A1 | 6/2016 | Yamaguchi et al. | |
| 2016/0332200 A1 | 11/2016 | Yamaguchi et al. | |

FOREIGN PATENT DOCUMENTS

| | | | |
|---|---|---|---|
| JP | 2016-215085 | 12/2016 | |
| WO | 2013/088609 | 6/2013 | |
| WO | 2014/174736 | 10/2014 | |
| WO | 2018/211023 | 11/2018 | |
| WO | WO-2018211023 A1 * | 11/2018 | ............ B07C 5/368 |

\* cited by examiner

FIG. 7 ated applications of mass consumption, mass consumption, and mass disposal types lead to global environmental problems such as global warming and depletion of

SORTING DEVICE

BACKGROUND

1. Technical Field

The present disclosure relates to a sorting device that sorts small pieces including specific types of materials from a target that is a group of a plurality small pieces, and particularly to a sorting device that sorts small pieces of a specific type of resin from a target obtained by crushing home appliances and the like after use.

2. Description of the Related Art

Economic activities of mass production, mass consumption, and mass disposal types lead to global environmental problems such as global warming and depletion of resources. In such circumstances, recycling of home appliances has drawn attention to construct a recycling-oriented society, and recycling of air conditioners, televisions, refrigerators, freezers, and laundry washing machines after use has been required as a duty.

In the related art, home appliances that have become unnecessary are crushed into small pieces in home appliance recycling plants, the small pieces are sorted depending on types of materials by using magnetic force, wind power, oscillation, or the like and are then reused as resources. In particular, small pieces made of metal are sorted depending on types of materials, such as iron, copper, and aluminum, by using a specific weight sorting device or a magnetic force sorting device.

Japanese Patent Unexamined Publication No. 2016-117038 (PTL 1) proposes a sorting method related to reusing of resin materials as resources.

Figure 7:
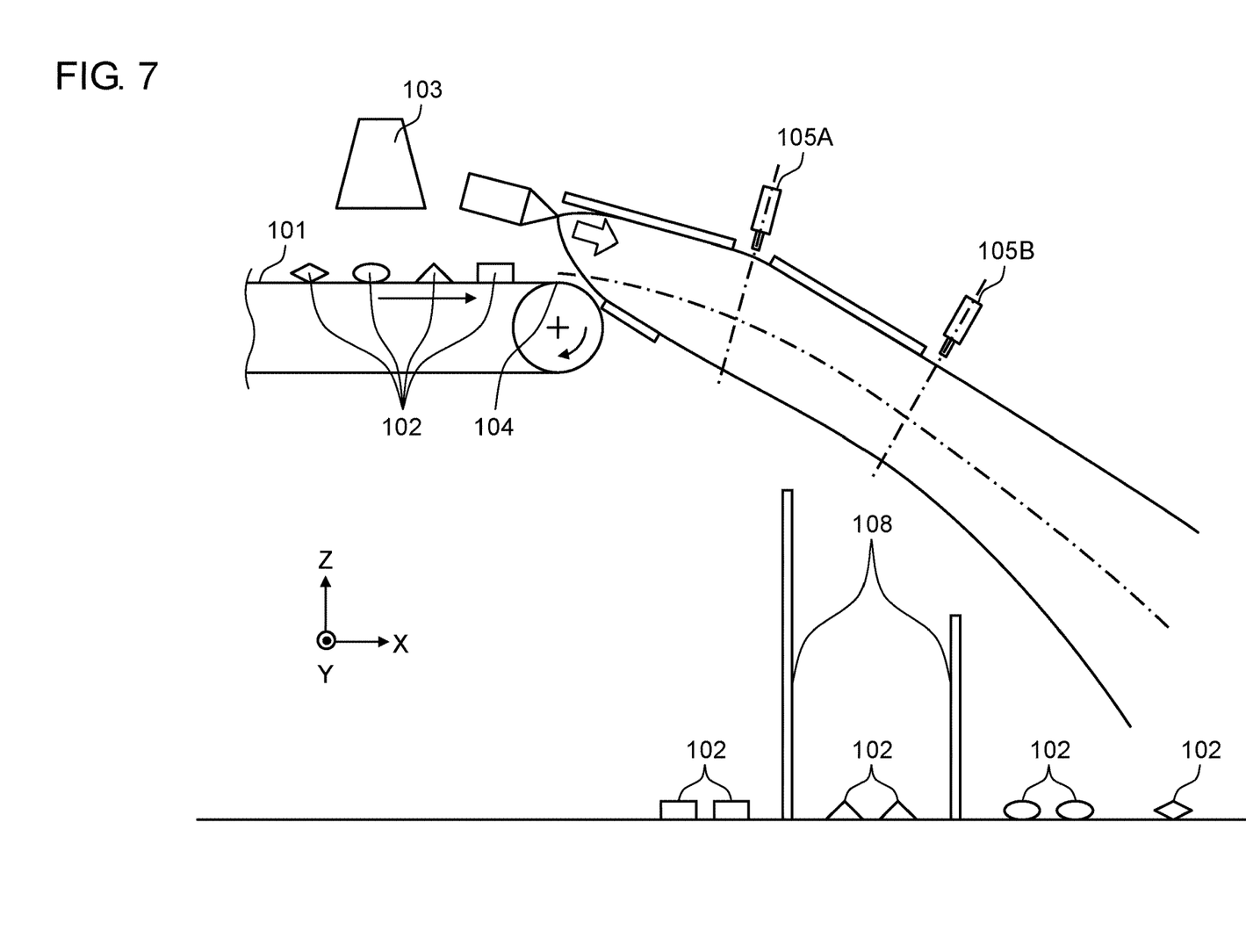
FIG. 7 is a device schematic view of a sorting device in the related art.

FIG. 7 is an outline configuration diagram of a sorting device in the related art according to Japanese Patent Unexamined Publication No. 2016-117038. This sorting device is a sorting device that sorts a specific material and the other materials from a target in which the specific material and the materials other than the specific materials are mixed.

Conveyor 101 transports small resin pieces 102, which are a target placed on conveyor 101, in one direction. The compositions of small resin pieces 102 are identified and position information thereof on conveyor 101 is also acquired when small resin pieces 102 pass below identification unit 103.

Small resin pieces 102 that have reached conveyor tip end 104 in a transport direction of conveyor 101 horizontally fly out at the same speed as a transport speed of conveyor 101.

Small resin pieces 102 thrown out from conveyor 101 in the horizontal direction fall while flying. At that time, pulse air is ejected to resin of a specific material in response to a command from identification unit 103 at a moment at which the resin of the specific material from among small resin pieces 102 passes through a position where the pulse air from nozzles of first nozzle group 105A and second nozzle group 105B are received. Then, only the resin of the specific material is hit, is made to fall, and is then collected at a compartment sectioned by sectioning plate 108.

Note that FIG. 7 illustrates a configuration in which two nozzle groups, namely first nozzle group 105A and second nozzle group 105B are used to simultaneously sort two types. However, a configuration in which only one type of resin material is selectively selected is employed in a case in which there is one nozzle group.

Also, FIG. 7 is a sectional view along an X-Z plane, and a plurality of nozzles are arranged in a Y direction that is vertical to the transport direction of conveyor 101 and that is a sheet penetrating direction of FIG. 7 in first nozzle group 105A or second nozzle group 105B. The Y direction is a width direction of conveyor 101. In first nozzle group 105A or second nozzle group 105B, nozzles are arranged such that they are aligned to cover the distance of the width dimension of conveyor 101. In this manner, it is possible to collect small resin pieces 102 even if small resin pieces 102 are randomly placed in the width direction of conveyor 101.

SUMMARY

A sorting device sorts a specific material and the other materials from a target in which the specific material and the materials other than the specific materials are mixed.

The sorting device has a transport unit, an identification unit, and a plurality of nozzles.

The transport unit transports the target in a first direction and causes the target to fly at a tip end thereof.

The identification unit identifies a composition of the target.

The plurality of nozzles are arranged along a flying route of the target and eject pulse air to the specific material that is flying from the transport unit.

Each of the plurality of nozzles has a valve that adjusts a flow amount of pulse air, a pulse air flow path that is connected to the valve, and a pulse air blowing port that is arranged at a tip end of the pulse air flow path.

The pulse air flow path has at least one bent portion.

An adjustment flow path is connected to the bent portion of the pulse air flow path.

An adjustment member capable of increasing and decreasing a volume of the adjustment flow path is provided in the adjustment flow path.

DETAILED DESCRIPTION

Due to distribution of the technology disclosed in PTL 1, reusing of the resin materials as resources has advanced. However, there has been a requirement for collecting resin that has been crushed into smaller sizes. In order to address the resin crushed into small sizes, it is necessary to reduce the distance between the nozzles and to arrange a large number of nozzles.

However, if it is attempted to realize the configuration in which a large number of nozzles are arranged by reducing the distance between the nozzles in the configuration in the related art, a degree of difficulty in designing air flow path resistance to be uniform for the respective nozzles increases. In addition, it is necessary to provide a valve necessary for ejecting and stopping air for each nozzle, and valve sizes become relatively large with respect to the distance between the nozzles. Therefore, the degree of difficulty in the designing for embedding the valve increases, and it is difficult to realize the uniform flow amount for all the nozzles.

Hereinafter, an embodiment of the present disclosure will be described in detail with reference to drawings.

Embodiment

Figure 1:
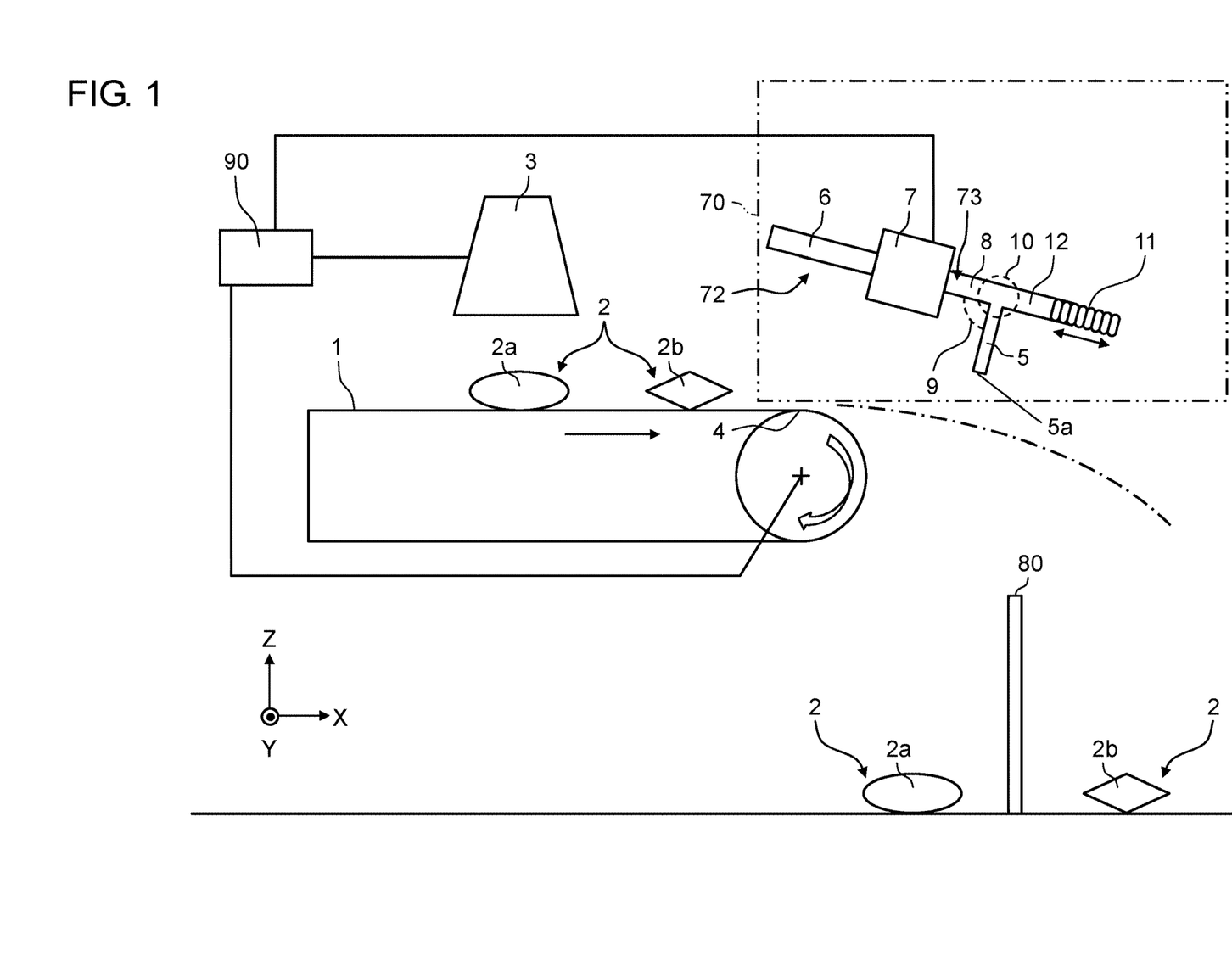
FIG. 1 is a schematic view of a sorting device according to an embodiment.

FIG. 1 is a schematic view of a sorting device according to an embodiment. The sorting device has a transport unit, identification unit 3, and nozzles 72 (ejection nozzles). One example of the transport unit corresponds to conveyor 1.

In FIG. 1, conveyor 1 transports small resin pieces 2, which are an example of a target placed on conveyor 1, in one direction (first direction). Identification unit 3 identifies a composition of small resin pieces 2 when small resin pieces 2 are passing below identification unit 3 and acquires information about positions on conveyor 1.

Small resin pieces 2 that have reached conveyor tip end 4 of conveyor 1 in the transport direction (first direction) fly out in the transport direction, for example, a horizontal direction at the same speed as the transport speed of conveyor 1.

Identification unit 3 identifies the composition of small resin pieces 2. Identification unit 3 is a device that identifies types of plastic from reflected light when infrared light is emitted, for example. Information obtained through the identification by identification unit 3 is sent to control unit 90.

Ejection nozzle group 70 includes a plurality of nozzles 72. Ejection nozzle group 70 is arranged along a flying route above the flying route of small resin pieces 2 as the target. Pulse air blowing ports 5a of ejection-side pulse air flow paths 5 of nozzles 72 in ejection nozzle group 70 are arranged to face the flying route. That is, nozzles 72 are arranged in a direction that intersects the first direction in which small resin pieces 2 as the target are transported. Ejection nozzle group 70 ejects pulse air to specific material 2a flying from conveyor 1.

Control unit 90 controls opening and closing of valves 7 (flow amount adjustment valves) of nozzles 72 in ejection nozzle group 70 on the basis of information identified by identification unit 3 and position information.

Small resin pieces 2 thrown out from conveyor 1 in the horizontal direction fall while flying. At this time, the pulse air is ejected to specific material 2a in response to a command from control unit 90 based on information from identification unit 3 at a moment at which special material 2a (a specific type of resin) from among small resin pieces 2 is passing through a position where pulse air ejected from pulse air blowing ports 5a of ejection-side pulse air flow paths 5 of nozzles 72 in ejection nozzle group 70. That is, the air flowing through air supply flow path 6 is controlled by valves 7 in response to the command from control unit 90, passes through valve-side valve air flow path 8, and advances to bent portion 10 that has bent portion angle 9. The flow amount of the air is adjusted by adjustment flow path 12 (flow path for adjusting flow amount of pulse air), the position of which is adjusted by adjustment screw 11 (screw for adjusting a flow amount of pulse air). Then, the air passes through ejection-side pulse air flow path 5 and pulse air blowing port 5a and is ejected as pulse air toward small resin pieces 2. With such a configuration, only specific material 2a is hit and made to fall and is collected in a compartment sectioned by sectioning plate 80. Meanwhile, no pulse air is ejected from nozzles 72 in a case of materials 2b (that is, small resin pieces other than the specific type) other than the specific material. Accordingly, other materials 2b are collected in a compartment outside the compartment sectioned by sectioning plate 80 beyond sectioning plate 80 without being hit and made to fall. As a result, small resin pieces 2 of the specific type and other small resin pieces 2 are sorted.

Here, ejection nozzle group 70 illustrated in FIG. 1 is configured such that a plurality of nozzles 72 are aligned in a Y direction (that is, the sheet penetrating direction). Each of nozzles 72 has ejection-side pulse air flow path 5, air supply flow path 6, valve 7, valve-side pulse air flow path 8, bent portion 10 that has bent portion angle 9, adjustment screw 11, and adjustment flow path 12.

Valve 7 is arranged at tip end of air supply flow path 6 that is formed by a linear air supply tube. Valve-side pulse air flow path 8 that is formed by a linear air supply tube is arranged at one end of valve 7. Tubular bent portion 10 is arranged at a tip end of valve-side pulse air flow path 8. Bent portion 10 is formed such that the tip end of valve-side pulse air flow path 8 and a base end of ejection-side pulse air flow path 5 are connected to each other at bent portion angle 9. Ejection-side pulse air flow path 5 is formed by a linear air ejection tube and has pulse air blowing port 5a at the tip end. Bent portion 10 has adjustment flow path 12 that is formed by a linear tube along an extending line in the axial direction thereof at the tip end of valve-side pulse air flow path 8. Adjustment screw 11, the position of which can be adjusted in the axial direction relative to adjustment flow path 12, is provided at the tip end of adjustment flow path 12.

In this manner, air supply flow path 6, valve 7, valve-side pulse air flow path 8, bent portion 10, and ejection-side pulse air flow path 5 from pulse air passage flow path 73. In the embodiment, the pulse air flow path is divided into ejection-side pulse air flow path 5 and valve-side pulse air flow path 8 via bent portion 10. Then, valve-side pulse air flow path 8 is linearly connected to adjustment flow path 12. However, valve-side pulse air flow path 8 and adjustment flow path 12 may not have a linear shape.

Ejection nozzle group 70 has the same basic function as that of first nozzle group 105A and second nozzle group 105B, namely the basic function of hitting only resin of a specific type and making it fall in the related art as illustrated in FIG. 7. Ejection nozzle group 70 has a form in which a plurality of nozzles 72 are arranged in a direction that is vertical to the transport direction of conveyor 1 and that is the Y direction (that is, the sheet penetrating direction) in FIG. 1. The Y direction is the width direction of conveyor 1. Since FIG. 1 is a sectional schematic view of an XZ plane, only one nozzle 72 is illustrated.

In ejection nozzle group 70, a plurality of nozzles 72 are aligned and arranged such that the distance of the width of conveyor 1 is covered. In this manner, it is possible to eject pulse air from any of nozzles 72, to hit small resin pieces 2, to make small resin pieces 2 fall, and then collect small resin pieces 2 even if small resin pieces 2 are randomly placed in the width direction of conveyor 1.

At this time, bent portion angle 9 that is a smaller angle of angles that are formed between valve-side pulse air flow path 8 and ejection-side pulse air flow path 5 is preferably set to be equal to or greater than 90 degrees and less than 180 degrees. In this manner, it is possible to eject the pulse air in a state in which a pressure loss of bent portion 10 is small. If bent portion angle 9 is less than 90 degrees, components that flow backward are generated due to the flow of the pulse air, which is unfavorable. If bent portion angle 9 is 180 degrees, the flow path from valve-side pulse air flow path 8 to ejection-side pulse air flow path 5 linearly extends, there becomes no pressure loss, the flow amount of the pulse air cannot be adjusted, and bent portion angle 9 is thus preferably set to be less than 180 degrees.

Adjustment screw 11 functions as an example of an adjustment member (pulse air flow amount adjustment member), and adjustment screw 11 is screwed into adjustment flow path 12. The volume inside the tube of adjustment flow path 12 can be variable by rotating forward and backward adjustment screw 11 relative to adjustment flow path 12, and the amount of pressing during adjustment of the flow amount of the pulse air can be changed.

In FIG. 1, adjustment screw 11 and adjustment flow path 12 are formed in each of all nozzles 72. With this configuration, the volume of adjustment flow path 12 is changed by a simple method of causing the amount of pressing to adjustment flow path 12 to increase and decrease by rotating forward and backward adjustment screw 11 in pulse air passage flow path 73. In this manner, it is possible to cause the flow path resistance at bent portion 10 to change and to thereby adjust the flow amount of the ejected pulse air to be uniform for all nozzles 72.

Here, in relation to adjustment screw 11, a member such as a pin may also be used as another example of the adjustment member for causing the flow amount of the pulse air to change. However, it is easier to change the amount of pressing during the adjustment of the flow amount of the pulse air with the screw that is screwed into adjustment flow path 12, by rotating the screw forward and backward relative to adjustment flow path 12. Therefore, the example of the screw will be described below.

According to the sorting device of the embodiment, adjustment flow path 12 that has adjustment screw 11 is used as described above. Therefore, it is possible to simply realize the uniform flow amount of ejection for all nozzles 72 even with the configuration in which the distance between nozzles 72 is set to be shorter and a large number of nozzles are arranged in order to collect small resin pieces 2 crushed into small sizes.

Note that the present invention is not limited to the aforementioned embodiment and can be implemented in other various modes as will be described below.

First Modification Example

Figure 2:
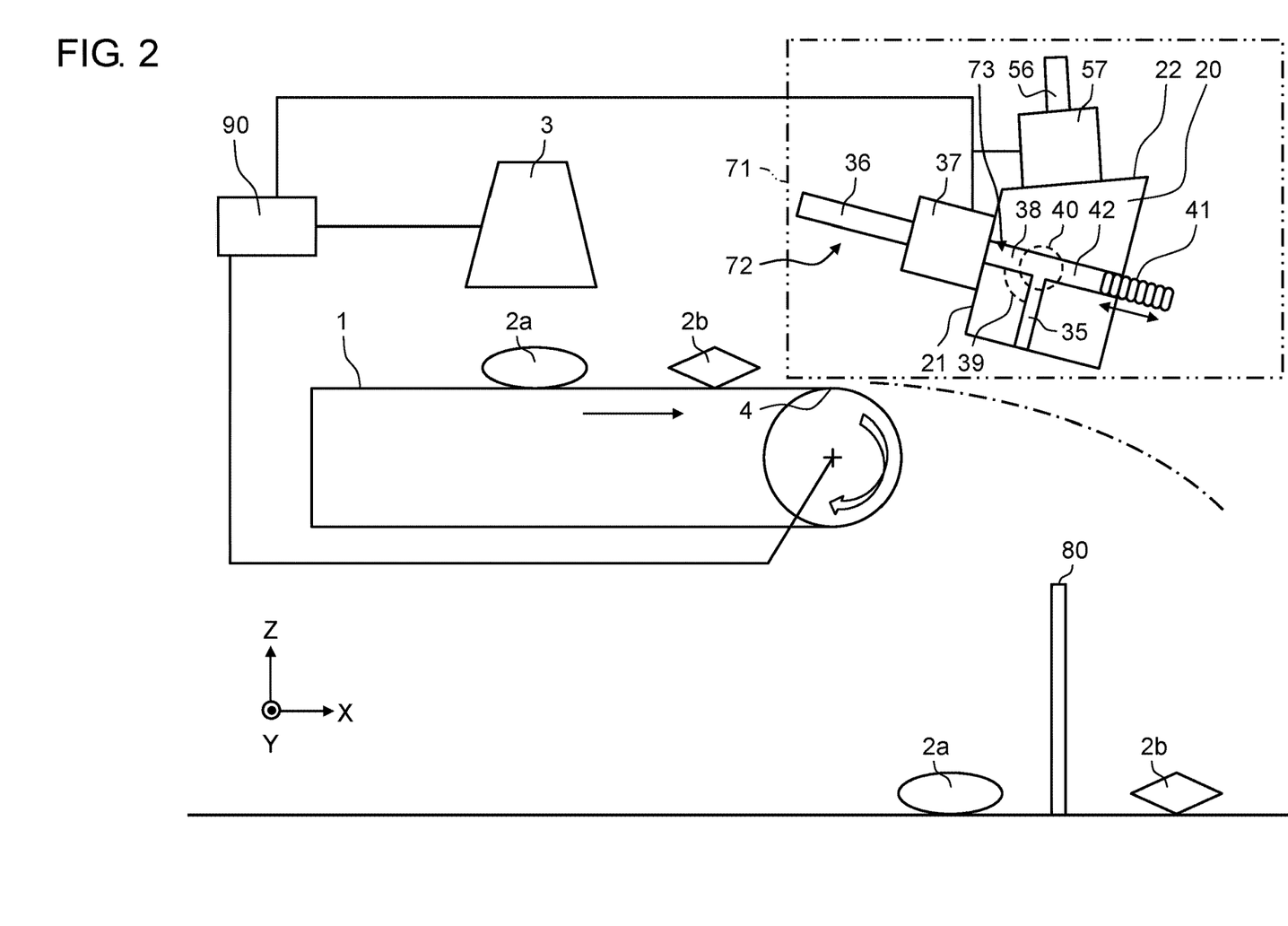
FIG. 2 is a schematic view of a sorting device on which an ejection nozzle group that has a plurality of fixing surfaces is mounted, according to a first modification example of the embodiment.

In a first modification example of the embodiment, it is also possible to employ a structure in which ejection nozzle group 70 in the device illustrated in FIG. 1 is replaced with ejection nozzle group 71 that has a plurality of fixing surfaces as illustrated in the schematic view in FIG. 2. With such a structure, it is possible to arrange adjacent first valve 37 and second valve 57 such that they do not interfere with each other by using second valve fixing surface 22 rather than first valve fixing surface 21 as the surface for fixing second valve 57 even in a case in which the distance between the nozzles is shorter than the width of each valve 7. Therefore, it is possible to further reduce the distance between the nozzles. Meanwhile, since adjacent valves 7 of ejection nozzle group 70 are at the same positions, and adjacent valves 7 interfere with each other in the aforementioned embodiment, it is not possible to reduce the distance between the nozzles to be shorter than the width of each valve 7.

The structure of ejection nozzle group 71 that has such plurality of fixing surfaces is as follows.

In FIG. 2, ejection nozzle group 71 that has a plurality of fixing surfaces has valve fixing unit 20 with a rectangular plate shape. Valve fixing unit 20 has first valve fixing surface 21 and second valve fixing surface 22. First valve 37 (first flow amount adjustment valve) is fixed to first valve fixing surface 21 while second valve 57 (second flow amount adjustment valve) is fixed to second valve fixing surface 22. That is, valve fixing unit 20 has first valve fixing surface 21 and second valve fixing surface 22 that fix first valve 37 and second valve 57, respectively. Then, adjacent first valve 37 and second valve 57 are arranged at mutually different first valve fixing surface 21 and second valve fixing surface 22. Note that although two valve fixing surfaces at valve fixing unit 20, namely first valve fixing surface 21 and second valve fixing surface 22 are illustrated here for simple description, the number of surfaces may be three or more.

Here, first air supply flow path 36, first valve 37, first valve-side pulse air flow path 38, first bent portion 40 that has first bent portion angle 39, first adjustment screw 41, first adjustment flow path 42, and first ejection-side pulse air flow path 35 correspond to air supply flow path 6, valve 7, valve-side pulse air flow path 8, bent portion 10 that has bent portion angle 9, adjustment screw 11, adjustment flow path 12, and ejection-side pulse air flow path 5 in FIG. 1, respectively.

Second Modification Example

Figure 3A:
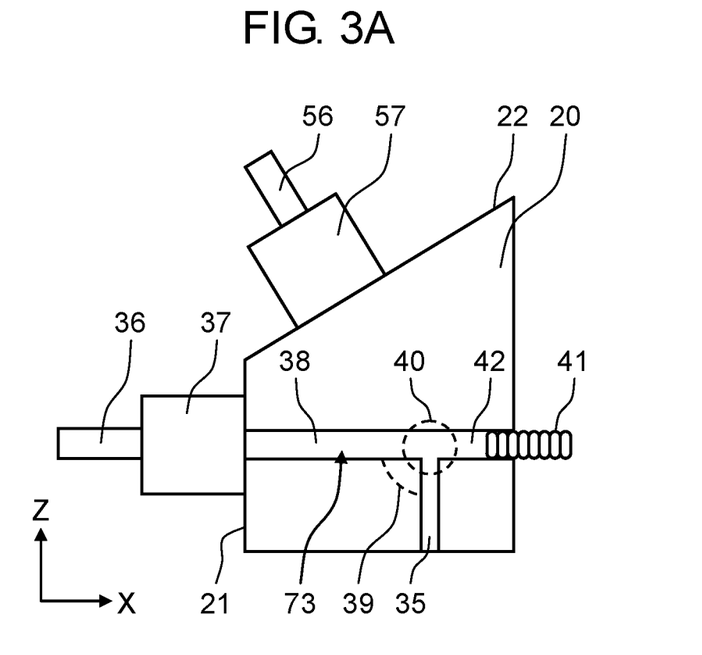
FIG. 3A is a diagram illustrating a first pulse air passage flow path that is connected to a first valve in an XZ plane in an ejection nozzle group that has a plurality of fixing surfaces, according to a second modification example of the embodiment.
Figure 3B:
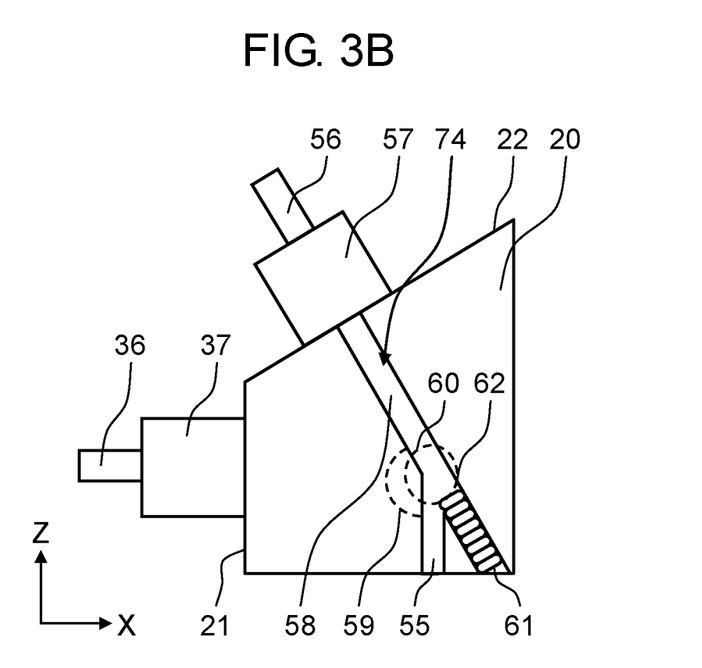
FIG. 3B is a diagram illustrating a second pulse air passage flow path that is connected to a second valve in the XZ plane in the ejection nozzle group that has the plurality of fixing surfaces, according to the second modification example of the embodiment.
Figure 3C:
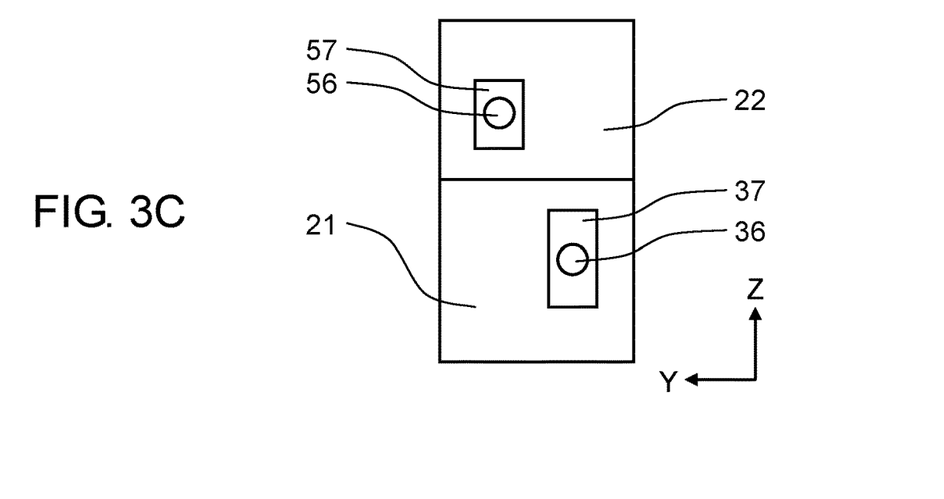
FIG. 3C is a front view of a first valve fixing surface in a YZ plane and is a diagram illustrating a second valve fixing surface in a perspective view, according to the second modification example of the embodiment.
Figure 3D:
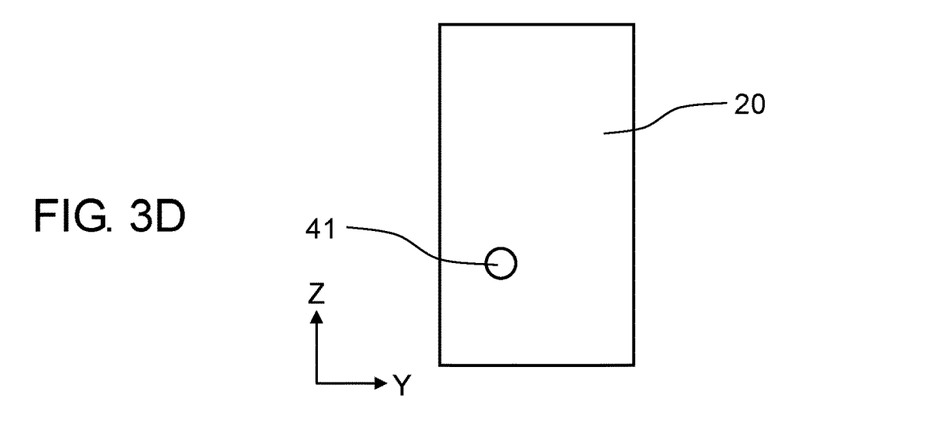
FIG. 3D is a front view of a surface, to which a first adjustment screw is connected, of a valve fixing unit in the YZ plane, according to the second modification example of the embodiment.
Figure 3E:
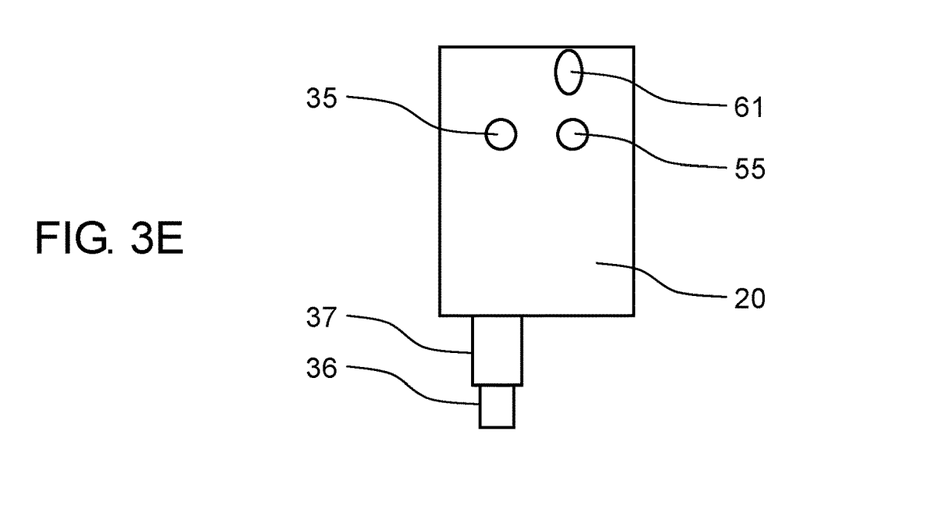
FIG. 3E is a front view of a surface, to which a first ejection-side pulse air flow path, a second ejection-side pulse air flow path, and a second adjustment screw are connected, of the valve fixing unit in a YX plane, according to the second modification example of the embodiment.

As a second modification example of the embodiment, FIGS. 3A to 3E are diagrams illustrating details of ejection nozzle group 71 that has a plurality of fixing surfaces. FIG. 3A is a diagram illustrating first pulse air passage flow path 73 that is connected to first valve 37 in the XZ plane and illustrates same ejection nozzle group 71 that has a plurality of fixing surfaces in FIG. 2. FIG. 3B is a diagram illustrating second pulse air passage flow path 74 that is connected to second valve 57 in the XZ plane. FIG. 3C is a front view of first valve fixing surface 21 and illustrates a perspective view of second valve fixing surface 22 in the YZ plane. FIG. 3D is a front view of a surface, to which first adjustment screw 41 (first pulse air flow amount adjustment screw) is connected, of valve fixing unit 20 in the YZ plane. FIG. 3E is a front view of a surface, to which first ejection-side pulse air flow path 35, second ejection-side pulse air flow path 55, and second adjustment screw 61 (second pulse air flow amount adjustment screw) are connected, of valve fixing unit 20 in the YX plane.

In FIG. 3A, the air flowing through first air supply flow path 36 is controlled by first valve 37 and advances to first valve-side pulse air flow path 38 in response to a command from control unit 90 based on information and the like from identification unit 3. Then, the air passes through first bent portion 40 that has first bent portion angle 39, and the flow amount thereof is adjusted at first adjustment flow path 42 (first pulse air flow amount adjustment flow path), the position of which has been adjusted with first adjustment screw 41. Then, the pulse air passes through first ejection-side pulse air flow path 35 and is then ejected.

Similarly, the air flowing through second air supply flow path 56 is controlled by second valve 57 and advances to second valve-side pulse air flow path 58 in response to commands from identification unit 3 and control unit 90 in FIG. 3B. Then, the air passes through second bent portion 60 that has second bent portion angle 59, and the flow amount thereof is adjusted at second adjustment flow path 62 (second pulse air flow amount adjustment flow path), the position of which has been adjusted with second adjustment screw 61. Then, the pulse air passes through second ejection-side pulse air flow path 55 and is then ejected.

Here, second air supply flow path 56, second valve 57, second valve-side pulse air flow path 58, second bent portion 60 that has second bent portion angle 59, second adjustment screw 61, second adjustment flow path 62, and second ejection-side pulse air flow path 55 correspond to first air supply flow path 36, first valve 37, first valve-side pulse air flow path 38, first bent portion 40 that has first bent portion angle 39, first adjustment screw 41, first adjustment flow path 42, and first ejection-side pulse air flow path 35 in FIG. 3A, respectively.

It is possible to ascertain that first bent portion angle 39 and second bent portion angle 59 are significantly different from each other in comparison between FIGS. 3A and 3B. That is, first bent portion angle 39 is approximately 90 degrees while second bent portion angle 59 is approximately 150 degrees, for example. In this manner, it is possible to realize equivalent flow amounts of ejected pulse air both in first adjustment flow path 42 and second adjustment flow path 62 with a simple method of turning the screw, namely first adjustment screw 41 or second adjustment screw 61 in a forward or backward direction and adjusting first adjustment flow path 42 or second adjustment flow path 62 even in a case in which first bent portion angle 39 and second bent portion angle 59 greatly differ from each other. There is a case in which it is desired to reduce the size of a flow amount adjustment mechanism including the pulse air passage flow path, the adjustment flow path, and the adjustment screw. In the embodiment, it is possible to prevent the flow amounts from being different from each other due to shapes of pulse air passage flow paths 73 and 74 even in a case in which there is no other way than to employ a design in which first bent portion angle 39 and second bent portion angle 59 are significantly different from each other. Therefore, it is possible to reduce the sizes of pulse air passage flow paths 73 and 74 and the flow amount adjustment mechanism.

Third Modification Example

Figure 4A:
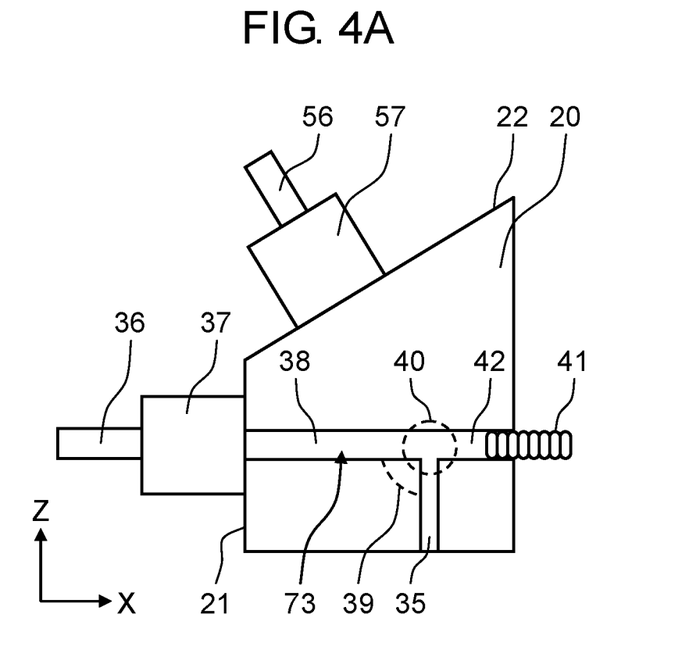
FIG. 4A is a diagram in which a first adjustment flow path is connected along an extending line of the first valve-side pulse air flow path in an axial direction in the ejection nozzle group that has the plurality of fixing surfaces, in which a plurality of adjustment screws are arranged in the same surfaces, according to a third modification example of the embodiment.
Figure 4B:
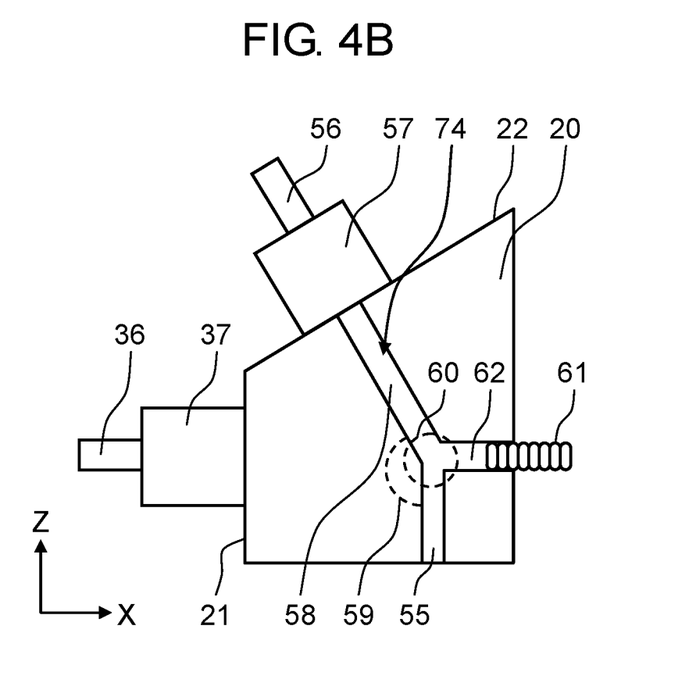
FIG. 4B is a diagram in which a second adjustment flow path is vertically connected to a surface in an X-axis positive direction of the valve fixing unit from a second bent portion in the ejection nozzle group that has a plurality of fixing surfaces, in which the plurality of adjustment screws are arranged in the same surface, according to the third modification example of the embodiment.
Figure 4C:
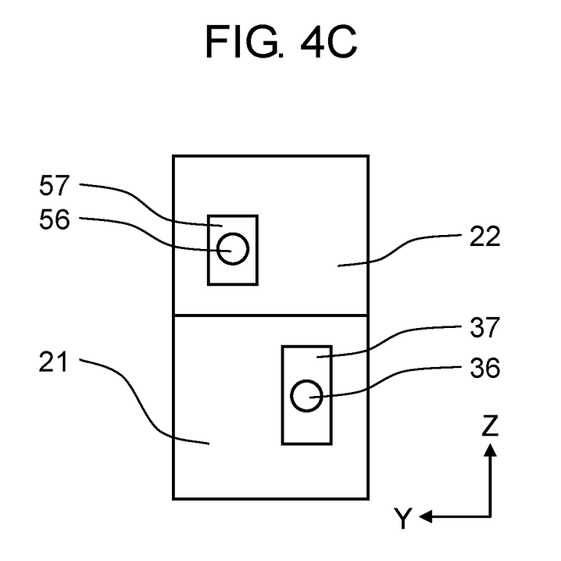
FIG. 4C is a diagram of the ejection nozzle group when viewed from the side of an air supply flow path, according to the third modification example of the embodiment.
Figure 4D:
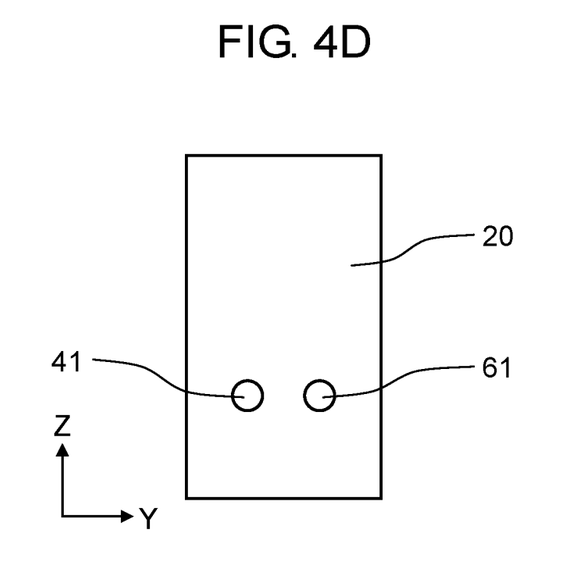
FIG. 4D is a diagram in which a first adjustment screw and a second adjustment screw are arranged to be adjacent to each other, according to the third modification example of the embodiment.

In FIG. 4A, first adjustment flow path 42 is connected along an extending line of first valve-side pulse air flow path 38 in an axial direction similarly to FIG. 3A. Meanwhile, a third modification example of the embodiment employs a structure in which second adjustment flow path 62 is connected substantially vertically to the surface of valve fixing unit 20 in the X-axis positive direction from second bent portion 60 instead of arranging second adjustment flow path 62 along the extending line of second valve-side pulse air flow path 58 in the axial direction, as illustrated in FIGS. 4B to 4D.

With such a structure, first adjustment flow path 42 and second adjustment flow path 62 are connected to the same surface of valve fixing unit 20. As a result, first adjustment screw 41 in FIG. 4A and second adjustment screw 61 in FIG. 4B are arranged to be adjacent to each other as illustrated in FIG. 4D. In this manner, an operation of adjusting the flow amount of each nozzle illustrated in FIGS. 4A and 4B becomes simple.

Note that first air supply flow path 36 and second air supply flow path 56 are arranged outside valve fixing unit 20 in the embodiment. However, first air supply flow path 36 and second air supply flow path 56 may be arranged inside valve fixing unit 20 for further reduction in size.

Fourth Modification Example

Figure 5:
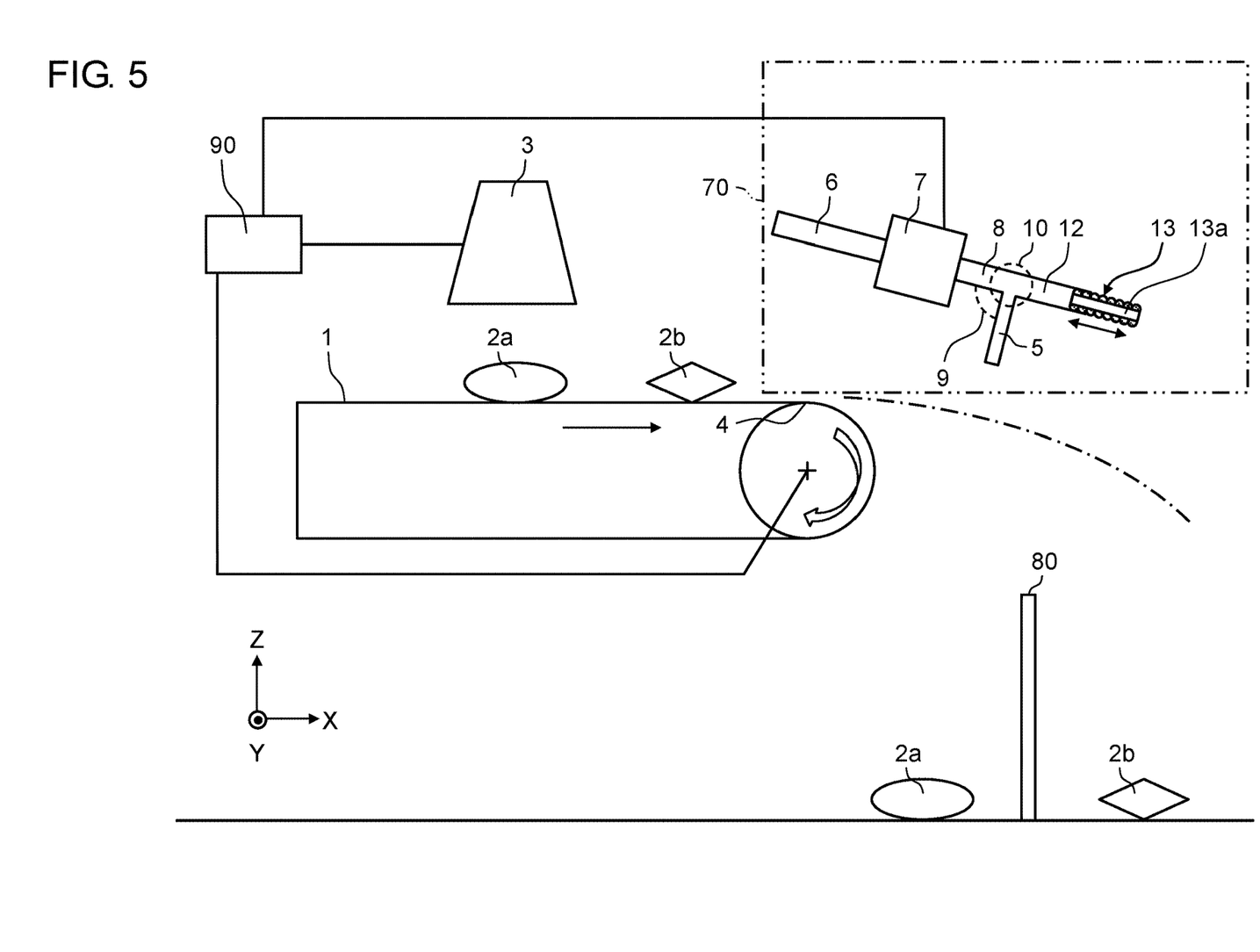
FIG. 5 is a schematic view of a sorting device, in which a pulse air flow amount adjustment screw that has a through-hole is arranged, according to a fourth modification example of the embodiment.

In the fourth modification example of the embodiment, adjustment screw 11 may be replaced with penetrating screw 13 (pulse air flow amount adjustment through-hole screw) that has through hole 13a as illustrated in FIG. 5. With this configuration, it is possible to stably eject the pulse air for the following reason.

Although each valve is brought into an opened state by electric control in a case in which valve 7 is controlled in an air returning scheme, it is necessary to provide a prescribed or greater pressure difference between air supply flow path 6 that is a primary-side flow path of valve 7 and valve-side pulse air flow path 8 that is a secondary-side flow path in order to bring valve 7 into a closed state. Here, the necessary pressure difference has to be designed such that the pressure of the primary-side flow path of valve 7 is higher while the pressure of the secondary-side flow path is lower. In a case in which one of or both flow path diameters of valve-side pulse air flow path 8 and ejection-side pulse air flow path 5 are reduced to be small diameters, it is difficult for the pulse air to be discharged. Therefore, there is a concern that the pressure of the secondary-side flow path also becomes high, it becomes not possible to sufficiently secure the aforementioned pressure difference, and valve 7 is maintained in the opened state.

Meanwhile, it is possible to discharge a remaining pressure of the secondary-side flow path to the outside through through-hole 13*a* of penetrating screw 13 by replacing adjustment screw 11 with penetrating screw 13. Therefore, the pressure of the secondary-side flow path decreases, and it is possible to secure the pressure difference. With such a configuration, it is possible to obtain the closed state of valve 7. Note that since through-hole 13*a* is a hole for discharging the air of the remaining pressure, it is possible to reduce the pressure supplied to air supply flow path 6 by reducing the inner diameter of through-hole 13*a* to be smaller than the inner diameter of ejection-side pulse air flow path 5.

Figure 6A:
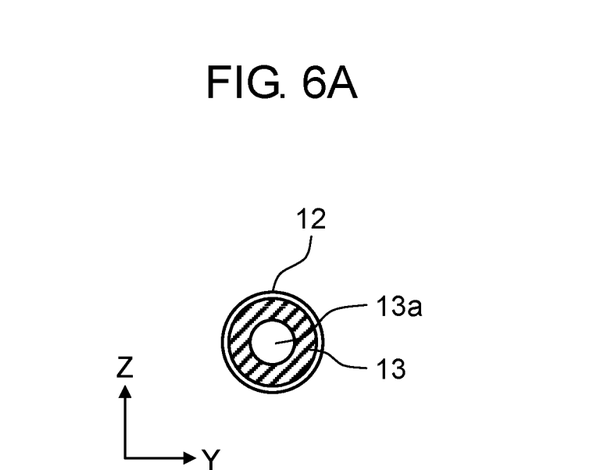
FIG. 6A is a sectional view of an example of an adjustment screw that has a through-hole, according to the fourth modification example of the embodiment.
Figure 6B:
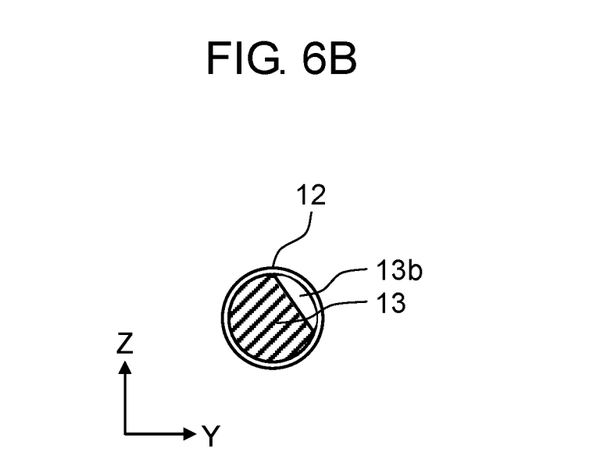
FIG. 6B is a sectional view of another example of the adjustment screw that has the through-hole, according to the fourth modification example of the embodiment.

Note that through-hole 13*a* may be worked such that through hole 13*a* is hollowed out into a columnar shape in a tubular axis direction inside the tubular shape of penetrating screw 13 as illustrated in FIG. 6A. Alternatively, gap 13*b* from adjustment flow path 12 may be provided by working the tubular shape of penetrating screw 13 such that a part thereof is shipped as illustrated in FIG. 6B.

Further, it is possible to adjust the amount of pressure to be discharged to the outside by changing the sizes and the lengths of through-hole 13*a* and gap 13*b* for each nozzle by providing through-hole 13*a* and gap 13*b*. Therefore, the degree of freedom in adjustment is improved with penetrating screw 13 than with adjustment screw 11 with neither through-hole nor gap.

Note that it is possible to achieve the respective effects by appropriately combining arbitrary embodiments or modification examples from among the aforementioned variety of embodiments and modification examples.

According to the sorting device of the present disclosure, it is possible to reduce the distance between the pulse air ejection nozzles and to arrange a large number of nozzles even if the flow path resistances of the pulse air flow paths for the respective nozzles significantly differ from each other, by using the adjustment flow path that has the adjustment member as described above. Accordingly, it is possible to simply realize the uniform flow amount of ejection for all the nozzles. In this manner, the sorting device according to the present disclosure can collect resin that has been crushed into smaller sizes than that in the related art. As a result, it is possible to further promote utilization of resin sorting.

What is claimed is:

1. A sorting device that sorts a specific material and materials other than the specific material from a target in which the specific material and the materials other than the specific materials are mixed, the sorting device comprising:
   a transport unit that transports the target in a first direction and causes the target to fly at a tip end of the transport unit;
   an identification unit that identifies a composition of the target; and
   a plurality of nozzles that are arranged along a flying route of the target and eject pulse air to the specific material that is flying from the transport unit,
   wherein each of the plurality of nozzles has a valve that adjusts a flow amount of the pulse air, a pulse air flow path that is connected to the valve, and a pulse air blowing port that is arranged at a tip end of the pulse air flow path,
   the pulse air flow path has at least one bent portion,
   an adjustment flow path is connected to the bent portion of the pulse air flow path, the bent portion being located between the adjustment flow path and the valve, and
   an adjustment member capable of increasing and decreasing a volume of the adjustment flow path is provided in the adjustment flow path.

2. The sorting device of claim 1,
   wherein an angle of the bent portion of the pulse air flow path is equal to or greater than 90 degrees and less than 180 degrees.

3. The sorting device of claim 2, further comprising:
   a plurality of valve fixing surfaces on which the plurality of valves are fixed,
   wherein adjacent valves among the plurality of valves are arranged on mutually different valve fixing surfaces from among the plurality of fixing surfaces.

4. The sorting device of claim 1, further comprising:
   a plurality of valve fixing surfaces on which the plurality of valves are fixed,
   wherein adjacent valves among the plurality of valves are arranged on mutually different valve fixing surfaces from among the plurality of fixing surfaces.

5. The sorting device of claim 1,
   wherein the adjustment member has a through-hole.

6. The sorting device of claim 1,
   wherein the adjustment member is a screw.

7. The sorting device of claim 1,
   wherein the plurality of nozzles are arranged in a direction that intersects the first direction in which the target is transported.

8. The sorting device of claim 1,
   wherein the pulse air flow path is divided into an ejection-side pulse air flow path and a valve-side pulse air flow path via the bent portion, and the valve-side pulse air flow path is linearly linked to the adjustment flow path.

9. A sorting device that sorts a specific material and materials other than the specific material from a target in which the specific material and the materials other than the specific materials are mixed, the sorting device comprising:
   a transport unit that transports the target in a first direction and causes the target to fly at a tip end of the transport unit;
   an identification unit that identifies a composition of the target; and
   a plurality of nozzles that are arranged along a flying route of the target and eject pulse air to the specific material that is flying from the transport unit,
   wherein each of the plurality of nozzles has a valve that adjusts a flow amount of the pulse air, a pulse air flow path that is connected to the valve, and a pulse air blowing port that is arranged at a tip end of the pulse air flow path,
   the pulse air flow path has at least one bent portion,
   an adjustment flow path is connected to the bent portion of the pulse air flow path, and
   a screw capable of increasing and decreasing a volume of the adjustment flow path is provided in the adjustment flow path.

* * * * *